US012577806B2

(12) United States Patent
Chen

(10) Patent No.: US 12,577,806 B2
(45) Date of Patent: Mar. 17, 2026

(54) NARROW-TYPE DOOR-LOCK DRIVING DEVICE

(71) Applicant: Shanghai Ming Wei Hardware Co., Ltd., Shanghai (CN)

(72) Inventor: Jung-Chung Chen, Shanghai (CN)

(73) Assignee: Shanghai Ming Wei Hardware Co., Ltd., Shanghai (CN)

( * ) Notice: Subject to any disclaimer, the term of this patent is extended or adjusted under 35 U.S.C. 154(b) by 66 days.

(21) Appl. No.: 18/662,011

(22) Filed: May 13, 2024

(65) Prior Publication Data

US 2025/0215726 A1 Jul. 3, 2025

(30) Foreign Application Priority Data

Jan. 3, 2024 (TW) ................................ 113200079

(51) Int. Cl.
*E05B 13/00* (2006.01)

(52) U.S. Cl.
CPC .................................. *E05B 13/002* (2013.01)

(58) Field of Classification Search
CPC ..... E05B 13/002; E05B 13/10; E05B 47/0657
See application file for complete search history.

(56) References Cited

U.S. PATENT DOCUMENTS

| | | | | |
|---|---|---|---|---|
| 2005/0103066 | A1* | 5/2005 | Botha | E05B 59/00 70/107 |
| 2017/0275922 | A1* | 9/2017 | Zeus | E05C 9/1891 |
| 2021/0018805 | A1* | 1/2021 | Baek | G02F 1/136286 |
| 2021/0277684 | A1* | 9/2021 | Moon | E05B 55/005 |
| 2022/0010590 | A1* | 1/2022 | Qiu | E05B 63/14 |
| 2022/0145666 | A1* | 5/2022 | Ma | E05B 55/005 |
| 2022/0205291 | A1* | 6/2022 | Cheung | E05B 53/00 |
| 2022/0403920 | A1* | 12/2022 | Varadaraju | E05B 63/042 |
| 2024/0018805 | A1* | 1/2024 | Mac Donald | E05C 9/002 |
| 2025/0218239 | A1* | 7/2025 | Chen | G07C 9/00944 |

* cited by examiner

*Primary Examiner* — Kristina R Fulton
*Assistant Examiner* — Thomas L Neubauer
(74) *Attorney, Agent, or Firm* — MUNCY, GEISSLER, OLDS & LOWE, P.C.

(57) ABSTRACT

A narrow-type door-lock driving device, disposed at a sectional door board, includes a base, a status switching mechanism, a status switching lock, a handle and a lock core driving mechanism. The status switching mechanism includes a lever and a stopper. The status switching lock connects with the lever and moves between a forbidden opening position and an allowing opening position by the lever. The lock core driving mechanism connects with the handle, blocked by the stopper and forbidden to be driven by the handle to keep the deadbolt snapping into the locking groove to maintain locked when the stopper is in the stop position, driven by the handle to allow driving a lock core component when the stopper is in the avoidance position, thereby allowing the deadbolt to snap out of the locking groove.

7 Claims, 7 Drawing Sheets

NARROW-TYPE DOOR-LOCK DRIVING DEVICE

This application claims the benefit of Taiwan Patent Application Serial No. 113200079, filed on Jan. 3, 2024, the subject matter of which is incorporated herein by reference.

BACKGROUND OF THE INVENTION

(1) Field of the Invention

The invention relates to a door-lock driving device, and more particularly to a narrow-type door-lock driving device for a sectional door.

(2) Description of the Prior Art

In order to control and manage people in a specific place, access control is usually set up at the entrance and exit doors. Only authorized people can open and enter the specific place to ensure the safety of the controlled area.

A sectional door is a door that uses a metal as the door-frame (aluminum or stainless steel in most cases) and embedded glass panels. Since sectional doors are stronger than traditional wooden doors and are not easily damaged and have better anti-theft properties, in recent years, more and more people have chosen sectional doors for access control.

However, since there is a glass panel embedded in the middle of the sectional door, the door-lock driving device cannot be installed through the glass panel but can only be installed through the metal door-frame of the sectional door. In the meanwhile, because the width of the metal door-frame of the current sectional door has its own specifications after decades of development and is generally narrow (about 50 mm wide), the traditional door-lock driving device may be wider than the metal door-frame because its body width is wider than the metal door-frame. It cannot be directly installed on the sectional door.

In order to assemble the door-lock driving device into the narrow-type door-frame of the sectional door, the door-lock driving device needs to reduce its body width. This will cause the space inside the door-lock driving device for mechanism to become compact, making it impossible to directly use the traditional door-lock driving device.

SUMMARY OF THE INVENTION

In view of the fact that, in the prior art, the narrow-type door-frame of the sectional door has a narrow width, and traditional door-lock driving device cannot be directly installed on the narrow-type door-frame of the sectional door. Therefore, a door-lock driving device with a narrow width must be designed for the narrow-type door-frame of the sectional door.

Accordingly, it is an object of the present invention to provide a narrow-type door-lock driving device, using the relevant components (including a status switching mechanism, a status switching lock, a lock core driving mechanism and a gear seat return spring) that drive the door-lock to be arranged in the base along a longitude direction. It causes that the power related to driving the door-lock can be transmitted along the longitude direction to form a power transmission chain, which allows the narrow-type door-lock driving device to be installed on the narrow-type door-frame, thereby solving the above problem.

On the basis of the above, the necessary technical means adopted by the present invention to solve the problem of the prior art is to provide a narrow-type door-lock driving device ("the door-lock driving device" hereinafter), disposed at a narrow-type door-frame of a sectional door board, the sectional door board including a locking side neighboring to a locking groove, the door-lock driving device being used for driving a lock core component disposed inside the sectional door board to drive a deadbolt to snap into or out of the locking groove, the door-lock driving device including a base, a status switching mechanism, a status switching lock, a handle and a lock core driving mechanism.

The base is disposed neighboring to the locking side of the sectional door board. The status switching mechanism is disposed at the base, including a lever and a stopper. The lever is pivoted to the base. The stopper is moved by the lever to move between a stop position and an avoidance position. The status switching lock is disposed at the base and connects with the lever, being driven by a key to move between a forbidden opening position and an allowing opening position, wherein when in the forbidden opening position, the status switching lock drives the lever to move the stopper to the stop position, wherein when in the allowing opening position, the status switching lock drives the lever to move the stopper to the avoidance position. The handle is disposed at the base.

The lock core driving mechanism connects with the handle and is driven by the handle, disposed through the base and the sectional door board, wherein when the stopper is in the stop position, the lock core driving mechanism is blocked by the stopper and forbidden to be driven by the handle, the deadbolt kept snapping into the locking groove to maintain a forbidden opening status, wherein when the status switching mechanism is in the avoidance position, the lock core driving mechanism is driven by the handle to allow driving the lock core component, thereby allowing the deadbolt to snap out of the locking groove to turn to an allowing opening status.

In one embodiment of the present invention, preferably, the handle includes a drive portion and an operation portion. The drive portion is disposed inside the base. The operation portion is extending out of the base from the drive portion, used for a user to operate and exert an unlocking operating force.

The lock core driving mechanism includes a first drive component, a linkage plate and a second drive component. The first drive component is driven by the drive portion. The linkage plate is driven by the first drive component to move along a linkage path, wherein when the stopper is in the stop position, the linkage plate is blocked by the stopper and forbidden to move along the linkage path. The second drive component is driven by the linkage plate to drive the lock core component, wherein when the linkage plate is forbidden to move along the linkage path, the second drive component is forbidden to drive the lock core component.

The first drive component includes a handle positioning plate linked to the drive portion. The linkage plate includes a rack. The second drive component includes a gear seat and a drive rod. The gear seat is engaged with the rack, driven by the linkage plate, the gear seat rotating from an initial position to an unlocking driving position when the user exerts the unlocking operating force. The drive rod is fixed at the gear seat, used for driving the lock core component. The gear seat includes a disk gear and an adapter sleeve. The disk gear is engaged with the rack for being driven by the linkage plate. The adapter sleeve is fixed at the disk gear and fitted to secure the drive rod.

The door-lock driving device further includes a gear seat return spring. The gear seat return spring is disposed between the base and the gear seat, rotating from the unlocking driving position back to the initial position when the unlocking operating force is removed.

As stated above, in the narrow-type door-lock driving device provided by the present invention, it uses the relevant components (including a status switching mechanism, a status switching lock, a lock core driving mechanism and a gear seat return spring) that drive the door-lock to be arranged in the base along a longitude direction, so the power related to driving the door-lock can be transmitted along the longitude direction to form a power transmission chain, thereby allowing the narrow-type door-lock driving device to be installed on the narrow-type door-frame.

All these objects are achieved by the narrow-type door-lock driving device described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a narrow-type door-lock driving device. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Since the narrow-type door-lock driving device provided by the present invention can be widely used on different types of sectional doors, there are countless combinations and variations. Here, only the following preferred embodiments will be specifically described for detailed description.

Figure 1:
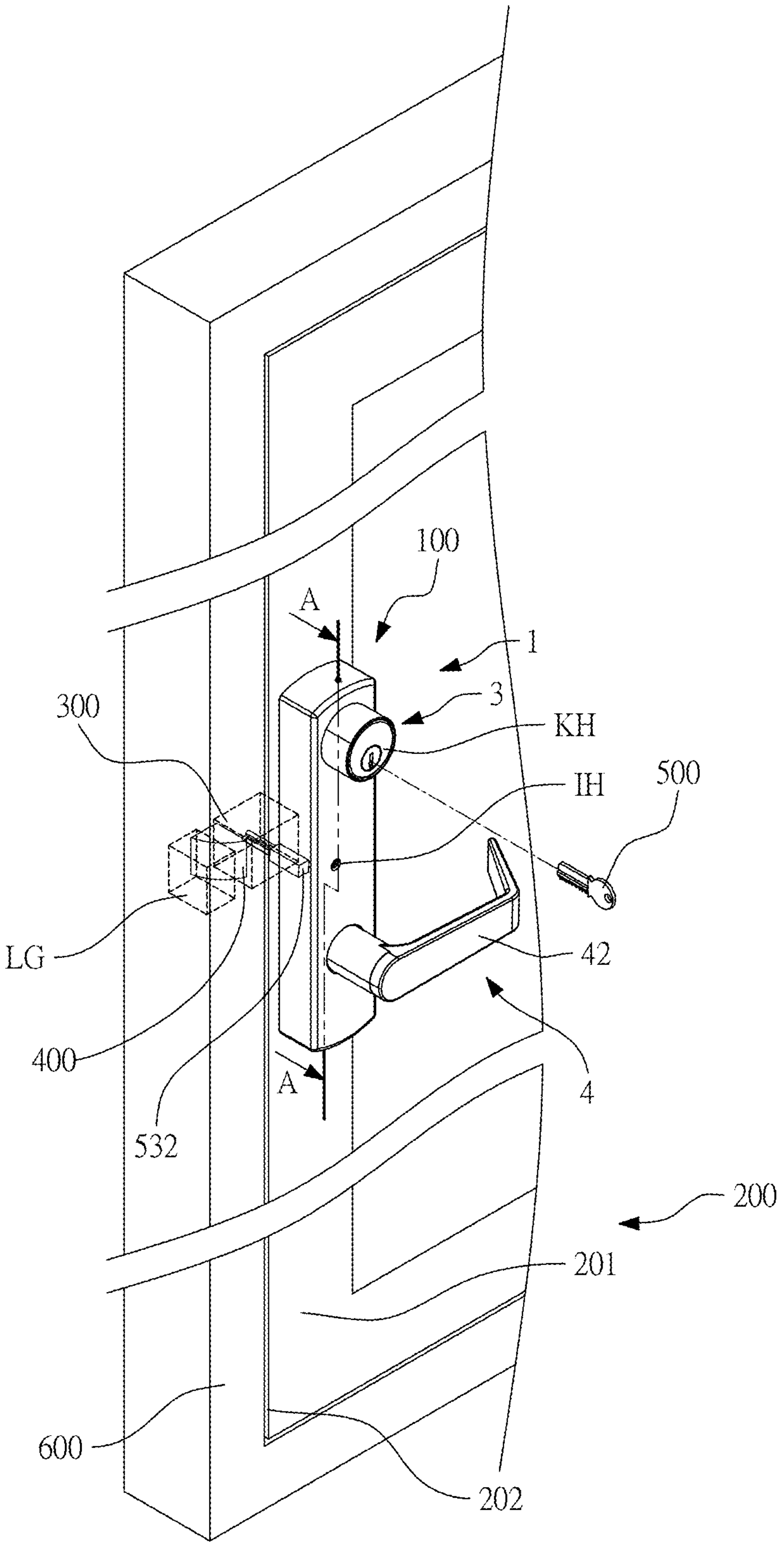
FIG. 1 demonstrates schematically a preferred embodiment of the narrow-type door-lock driving device in accordance with the present invention, installed behind a sectional door.
Figure 2:
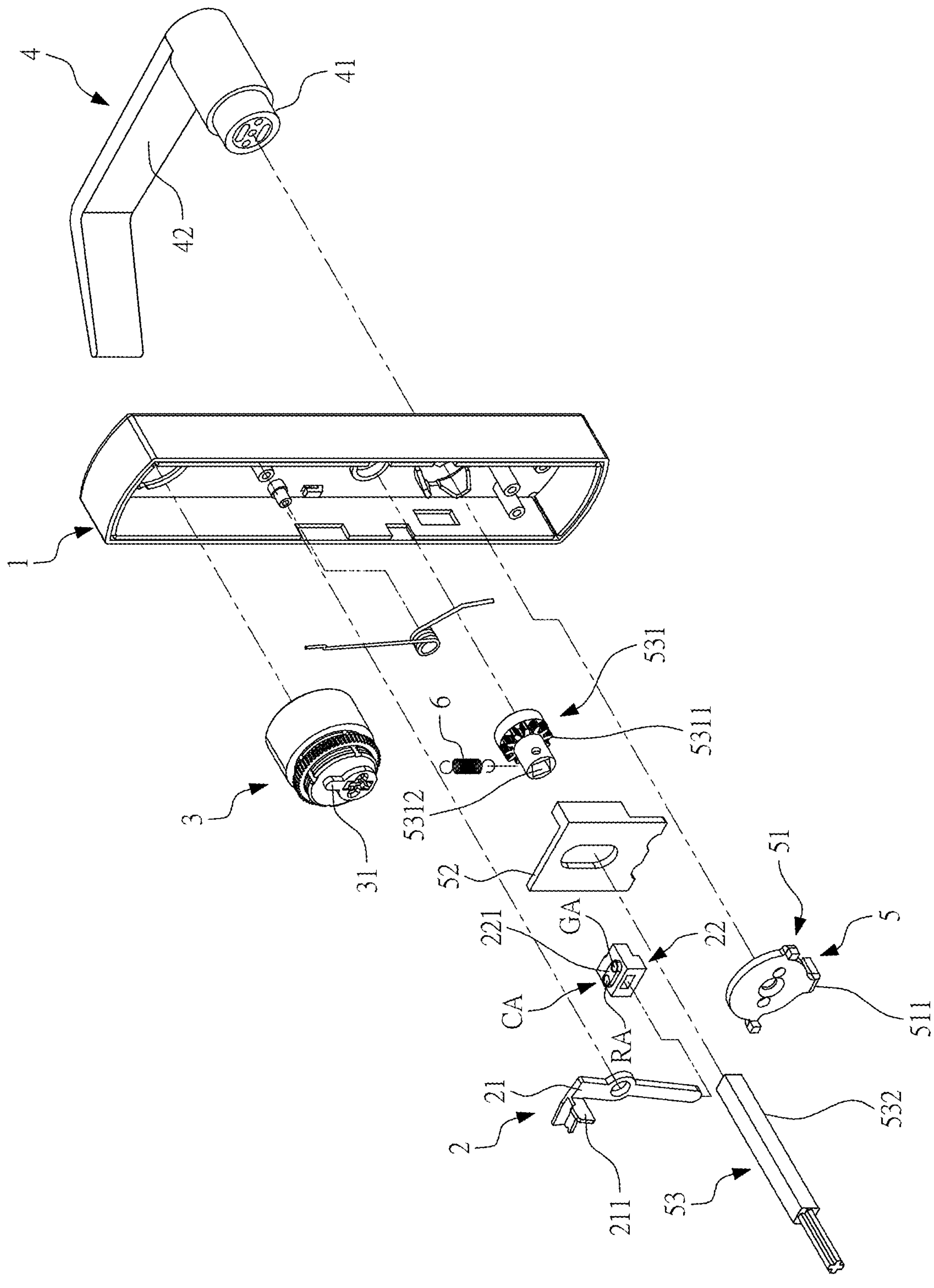
FIG. 2 is an exploded schematic view of the partial components of the narrow-type door-lock driving device in accordance with the preferred embodiment of the present invention.
Figure 3:
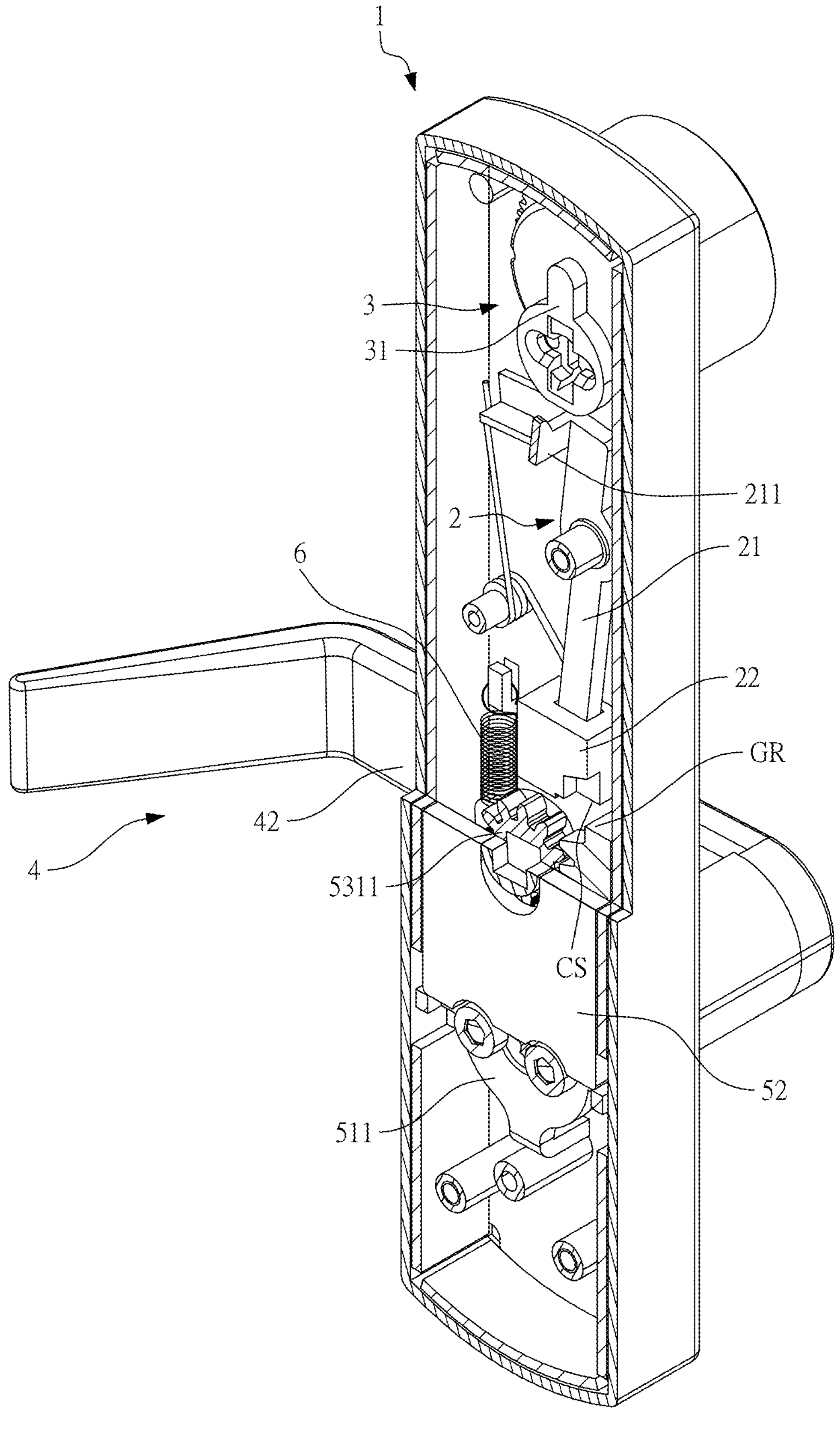
FIG. 3 shows a three-dimensional cross-sectional view of the narrow-type door-lock driving device along the A-A perspective of the preferred embodiment of the present invention.

Referring to FIG. 1 to FIG. 3; where FIG. 1 demonstrates schematically a preferred embodiment of the narrow-type door-lock driving device in accordance with the present invention, installed behind a sectional door, FIG. 2 is an exploded schematic view of the partial components of the narrow-type door-lock driving device in accordance with the preferred embodiment of the present invention, and FIG. 3 shows a three-dimensional cross-sectional view of the narrow-type door-lock driving device along the A-A perspective of the preferred embodiment of the present invention.

As shown from FIG. 1 to FIG. 3, a narrow-type door-lock driving device ("the door-lock driving device" hereinafter) 100 is disposed at a narrow-type door-frame 201 of a sectional door board 200, the narrow-type door-frame 201 including a lock core component 300, a deadbolt 400 and a locking side 202 neighboring to a locking groove LG. The narrow-type door-frame 201 is made of metal (mostly aluminum or stainless steel), and the width of the narrow-type door-frame 201 has its own specifications after decades of development and is generally narrow (the width is about 5 cm).

The lock core component 300 is used for driving the deadbolt 400 to snap into or out of the locking groove LG. Since the structure and working principle of the lock core component 300 are the same as or similar to those of the prior art and are not an original structure in this invention, they will not be described in detail in this embodiment and their relative positions are only indicated by a dotted block diagram. The locking groove LG can be provided in an outer door-frame 600.

The door-lock driving device 100 includes a base 1, a status switching mechanism 2, a status switching lock 3, a handle 4, a lock core driving mechanism 5 and a gear seat return spring 6.

Wherein the relevant components (including a status switching mechanism 2, a status switching lock 3, a lock core driving mechanism 5 and a gear seat return spring 6) that drive the door-lock are arranged in the base 1 along a longitude direction LD, so the power related to driving the door-lock can be transmitted upwards from the handle 4 along the longitude direction LD to form a power transmission chain, thereby allowing the door-lock driving device 100 to be installed on the narrow-type door-frame 201.

The base 1 is disposed neighboring to the locking side 202 of the sectional door board 200, including a status indication hole IH and a stroke limiting groove TG, having a side length L1 and a bottom length L2. The side length L1 is usually three times the bottom length L2 to limit the body width of the door-lock driving device 100, thereby allowing the door-lock driving device 100 to be installed on a narrow-type door-frame 201. The status switching mechanism 2 is disposed at the base and includes a lever 21 and a stopper 22. The lever 21 is pivoted to the base 1, and a lever baffle 211 extends from the lever 21. The stopper 22 includes a contact surface CS and is moved by the lever 21, and the stopper 22 has a stroke limiting protrusion 221 on one side facing the base 1.

Figure 6:
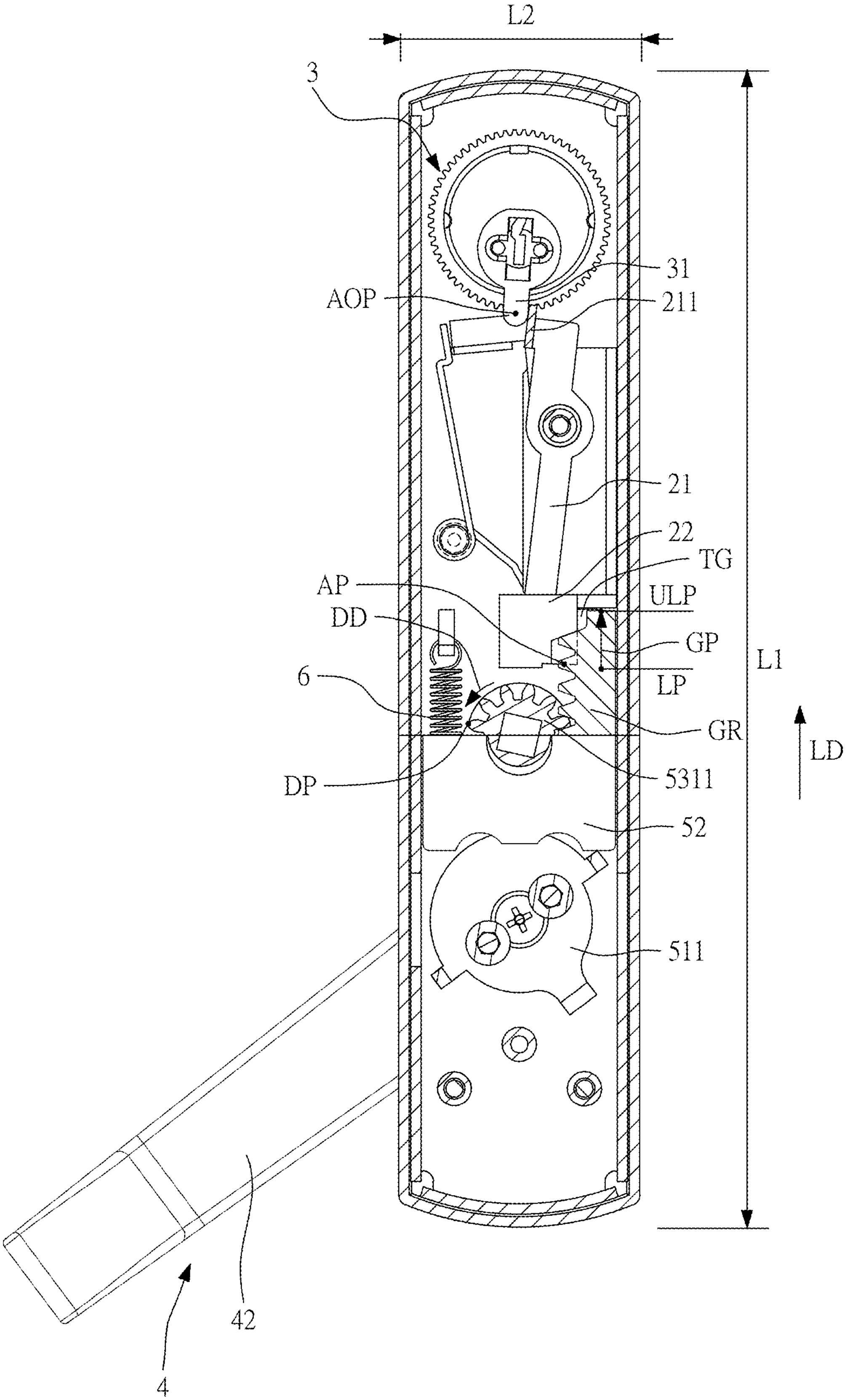
FIG. 6 shows a cross-sectional view of the narrow-type door-lock driving device in FIG. 5 along the B-B perspective.

The stroke limiting protrusion 221 includes a color marked area CA, and is restricted by the stroke limiting groove TG so that the stopper 22 is restricted from moving between a stop position SP and an avoidance position AP (marked in FIG. 6). The color marked area CA includes a green marked area GA representing an allowing opening status and a red marked area RA representing a forbidden opening status. When in the allowing opening status and in the forbidden opening status, the green marked area GA and the red marked area RA are respectively aligned with the status indication hole IH to allow a user to check through the status indication hole IH that the door-lock driving device 100 is in the allowing opening status or the forbidden opening status.

The status switching lock 3 is extended from the base 1 and exposed to the base 1, a keyhole KH formed thereon, the status switching lock 3 including a protrusion 31 for moving the lever 21 to move the stopper 22, thereby switching the door-lock driving device 100 between the allowing opening status and the forbidden opening status. The handle 4 is disposed at the base 1 and includes a drive portion 41 and an operation portion 42. The operation portion 42 extends out of the base 1 from the drive portion 41, used for a user to operate and exert an unlocking operating force.

The lock core driving mechanism 5 connects with the handle 4 and is disposed through the base 1 and the sectional door board 200, including a first drive component 51, a linkage plate 52 and a second drive component 53. The first drive component 51 is driven by the drive portion 41, and includes a handle positioning plate 511 linked with the drive portion 41. The linkage plate 52 is driven by the first drive component 51, and includes a rack GR.

The second drive component 53 is driven by the linkage plate 52 to drive the lock core component 300, and includes a gear seat 531 and a drive rod 532. The gear seat 531 engages with the rack GR, and includes a disk gear 5311 and an adapter sleeve 5312. The disk gear 5311 engages with the rack GR for being driven by the linkage plate 52. The adapter sleeve 5312 is fixed at the disk gear 5311 and fitted to secure the drive rod 532. The drive rod 532 is fixed at the gear seat 531, used for driving the lock core component 300. The gear seat return spring 6 is disposed between the base 1 and the gear seat 531.

In the forbidden opening status, the stopper 22 is located in the stop position SP. At this time, the contact surface CS of the stopper 22 contacts the linkage plate 52 and blocks the linkage plate 52 from a locking position LP along a linkage path GP (marked in FIG. 6) to move to an unlocking position ULP (marked in FIG. 6). The gear seat 531 of the second drive component 53 is located in an initial position IP and prohibits the drive rod 532 from driving the lock core component 300, and causes the lock core component 300 to maintain a forbidden opening status so that the deadbolt 400 is kept snapping into the locking groove LG.

Figure 4:
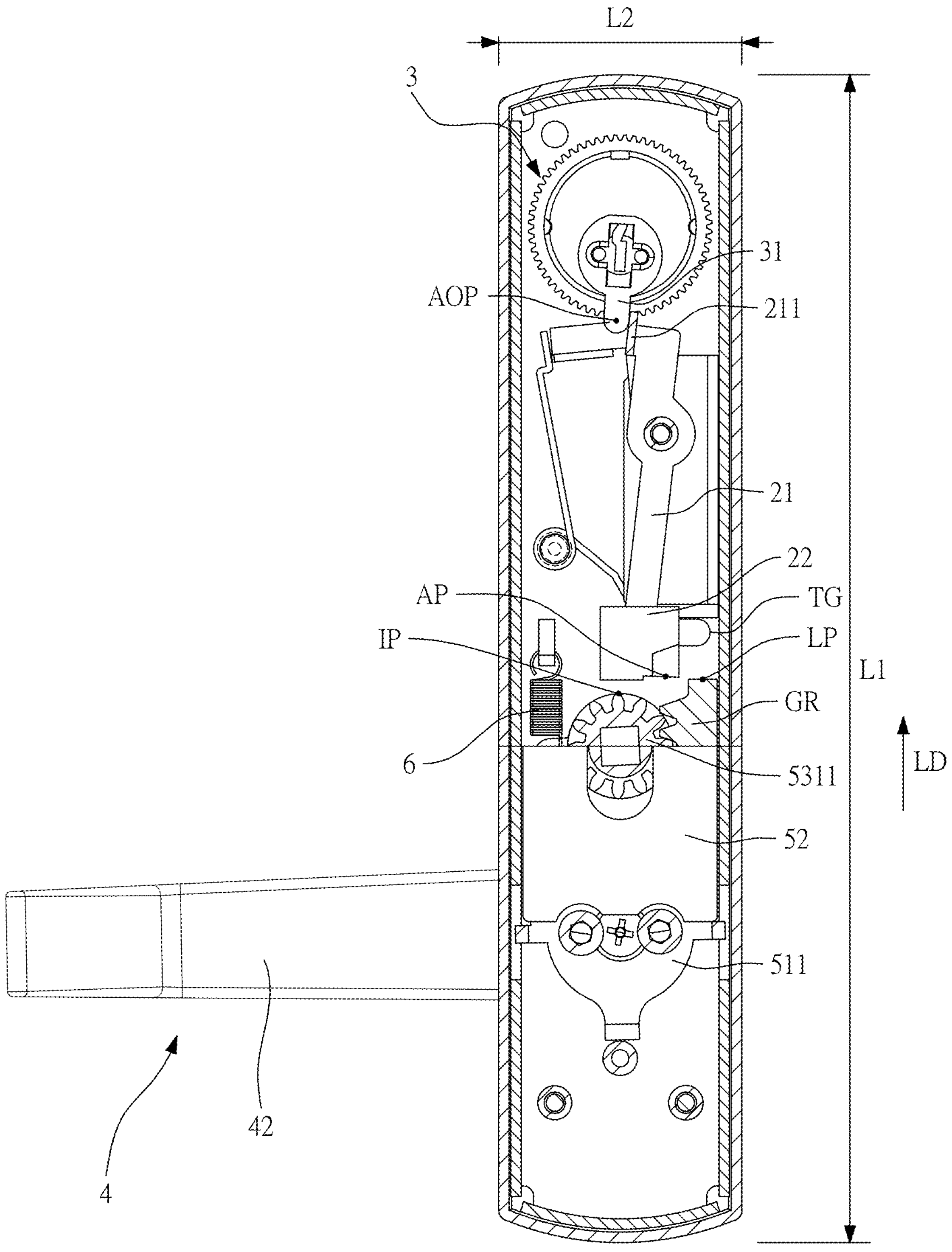
FIG. 4 is a schematic diagram showing the positional relationship of partial components of the narrow-type door-lock driving device in the allowing opening status of the preferred embodiment of the present invention.
Figure 5:
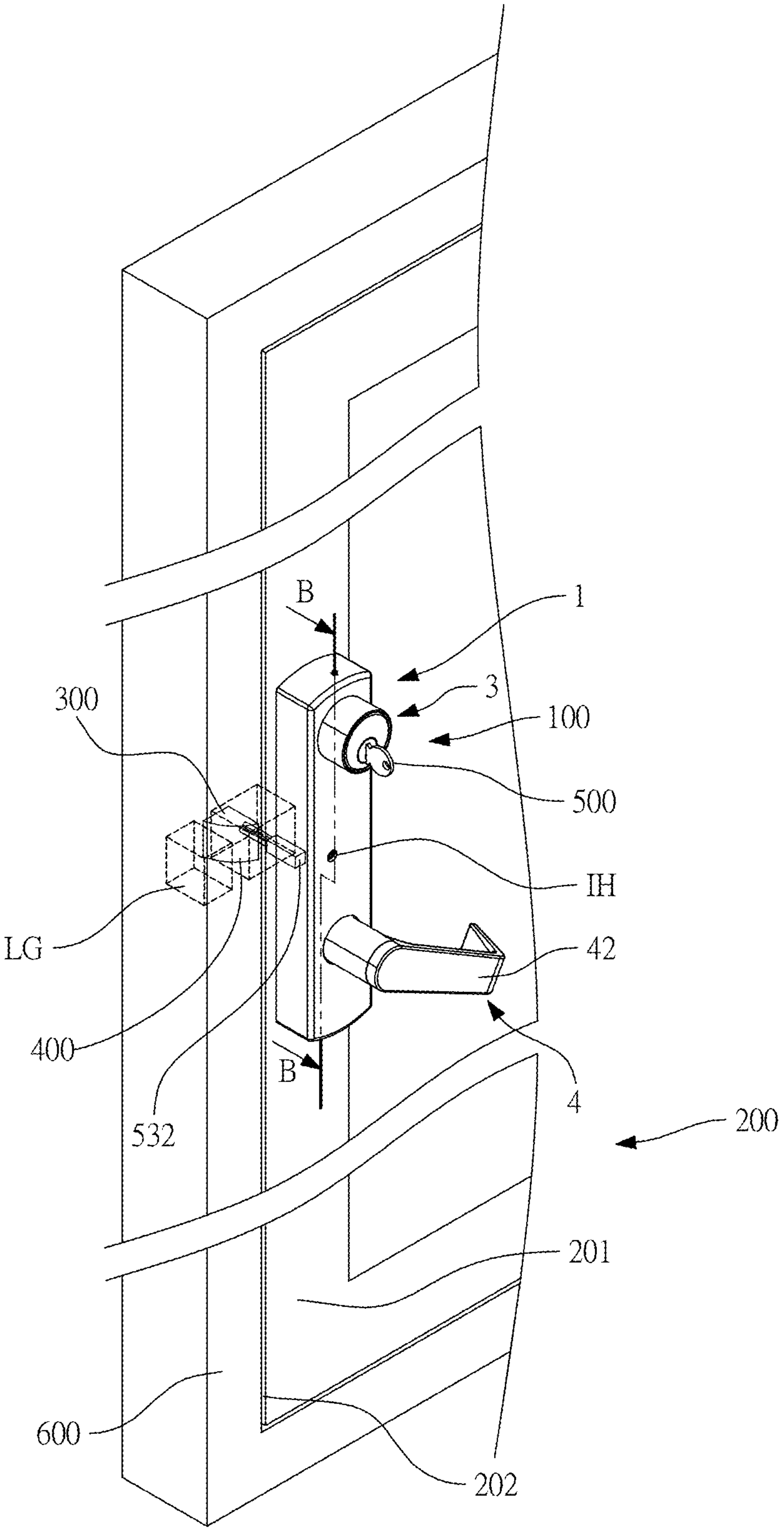
FIG. 5 is a schematic diagram showing the narrow-type door-lock driving device of the preferred embodiment of the present invention after being assembled on the sectional door and being operated to unlock the door.
Figure 7:
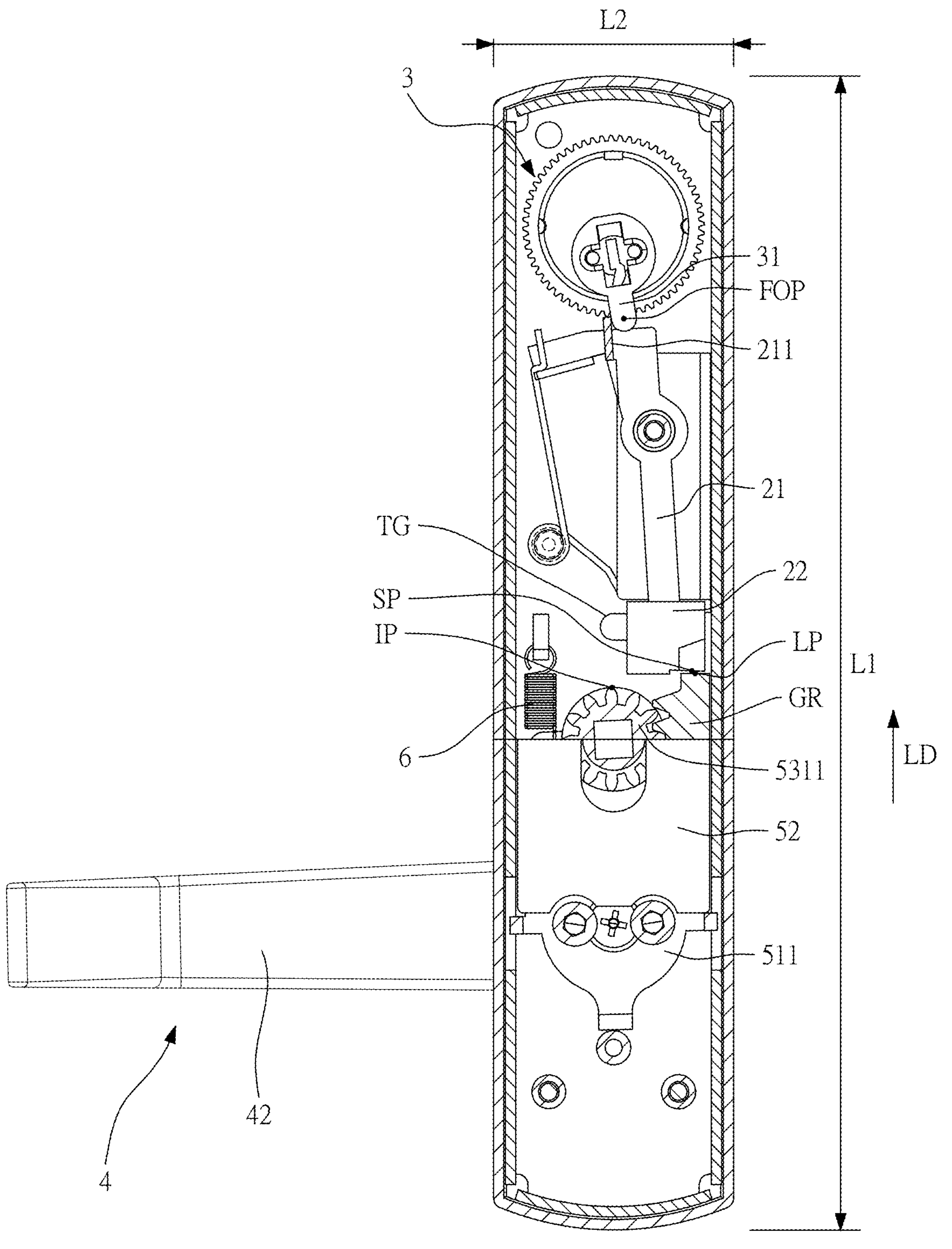
FIG. 7 is a schematic diagram showing the positional relationship of partial components of the narrow-type door-lock driving device in the forbidden opening status of the preferred embodiment of the present invention.

Referring now to FIG. 4 to FIG. 7; where FIG. 4 is a schematic diagram showing the positional relationship of partial components of the narrow-type door-lock driving device in the allowing opening status of the preferred embodiment of the present invention, FIG. 5 is a schematic diagram showing the narrow-type door-lock driving device of the preferred embodiment of the present invention after being assembled on the sectional door and being operated to unlock the door, FIG. 6 shows a cross-sectional view of the narrow-type door-lock driving device in FIG. 5 along the B-B perspective, and FIG. 7 is a schematic diagram showing the positional relationship of partial components of the narrow-type door-lock driving device in the forbidden opening status of the preferred embodiment of the present invention. Please also refer to FIG. 1 to FIG. 3.

When the door-lock driving device 100 is in the forbidden opening status and the user inserts a key 500 into the keyhole KH and drives the status switching lock 3 to rotate, the protrusion 31 of the status switching lock 3 rotates counterclockwise and moves to an allowing opening position AOP. In the meanwhile, the protrusion 31 moves the lever baffle 211, thereby moving the stopper 22 from the stop position SP to the avoidance position AP, and transforms the door-lock driving device 100 into the allowing opening status. The avoidance position AP is to avoid the linkage path GP to allow the linkage plate 52 to move from the locking position LP along the linkage path GP to the unlocking position ULP.

In the allowing opening status, when the operation portion 42 of the handle 4 receives an unlocking operating force exerted by the user and is pressed down to operate, the handle positioning plate 511 of the first drive component 51 rotates and pushes the linkage plate 52 in conjunction, so that the linkage plate 52 moves along the linkage path GP. The gear seat 531 of the second drive component 53 is driven to rotate from the initial position IP to an unlocking driving position DP along a driving direction DD through the tooth row GR of the linkage plate 52.

When the gear seat 531 is driven to rotate to the unlocking driving position DP, the drive rod 532 drives the lock core component 300, so that the lock core component 300 drives the deadbolt 400 to snap out of the locking groove LG and transform from the forbidden opening status to the allowing opening status. After the door-lock driving device 100 changes from the forbidden opening status to the allowing opening status and the unlocking operating force is removed, the gear seat return spring 6 provides a rotational return force to rotate the gear seat 531 from the unlocking driving position DP back to the initial position IP.

When the door-lock driving device 100 is in the allowing opening status and the user inserts the key 500 into the keyhole KH and drives the status switching lock 3 to rotate, the protrusion 31 of the status switching lock 3 rotates clockwise and moves to a forbidden opening position FOP. In the meanwhile, the protrusion 31 moves the lever baffle 211, thereby moving the stopper 22 from the avoidance position AP to the stop position SP, and transforms the door-lock driving device 100 back to the forbidden opening status.

In summary, in the door-lock driving device 100 provided by the present invention, it uses all components related to the means (including a status switching mechanism 2, a status switching lock 3, a lock core driving mechanism 5 and a gear seat return spring 6) that drive the lock core component 300 to be sequentially arranged in the base 1 along the longitude direction LD, so the power related to driving the door-lock can be transmitted upwards along the longitude direction LD from the handle 4 to form a power transmission chain, thereby allowing the door-lock driving device 100 to be installed on the narrow-type door-frame 201.

While the present invention has been particularly shown and described with reference to a preferred embodiment, it will be understood by those skilled in the art that various changes in form and detail may be without departing from the spirit and scope of the present invention.

What is claimed is:

1. A narrow-type door-lock driving device, disposed at a narrow-type door-frame of a sectional door board, the sectional door board including a locking side neighboring to a locking groove, the narrow-type door-lock driving device being used for driving a lock core component disposed inside the sectional door board to drive a deadbolt to snap into or out of the locking groove, the narrow-type door-lock driving device comprising:

a base, disposed neighboring to the locking side of the sectional door board;

a status switching mechanism, disposed at the base, including:

a lever, pivoted to the base; and a stopper, moved by the lever to move between a stop position and an avoidance position;

a status switching lock, disposed at the base and driven by a key to move between a forbidden opening position and an allowing opening position, wherein when in the forbidden opening position, the status switching lock drives the lever to move the stopper to the stop position, wherein when in the allowing opening position, the status switching lock drives the lever to move the stopper to the avoidance position;

a handle, disposed at the base; and a lock core driving mechanism, connected with the handle and driven by the handle, disposed through the base and the sectional door board, wherein when the stopper is in the stop position, the lock core driving mechanism is blocked by the stopper and forbidden to be driven by the handle, the deadbolt kept snapping into the locking groove to maintain a forbidden opening status, wherein when the status switching mechanism is in the avoidance position, the lock core driving mechanism is driven by the handle to allow driving the lock core component, thereby allowing the deadbolt to snap out of the locking groove to turn to an allowing opening status;

wherein the status switching lock is exposed to the base; a keyhole is formed on the status switching lock; the status switching lock includes a protrusion; and wherein when a key is inserted into the key-hole by a user to drive the status switching lock to rotate, the protrusion is moved to drive the lever.

2. The narrow-type door-lock driving device of claim 1, wherein the handle includes:

a drive portion, disposed inside the base; and an operation portion, extending out of the base from the drive portion, used for a user to operate and exert an unlocking operating force.

3. The narrow-type door-lock driving device of claim 2, wherein the lock core driving mechanism includes:

a first drive component, driven by the drive portion;

a linkage plate, driven by the first drive component to move along a linkage path, wherein when the stopper is in the stop position, the linkage plate is blocked by the stopper and forbidden to move along the linkage path; and a second drive component, driven by the linkage plate to drive the lock core component, wherein when the linkage plate is forbidden to move along the linkage path, the second drive component is forbidden to drive the lock core component.

4. The narrow-type door-lock driving device of claim 3, wherein the first drive component includes a handle positioning plate linked to the drive portion.

5. The narrow-type door-lock driving device of claim 3, wherein the linkage plate includes a rack, the second drive component including:

a gear seat, engaged with the rack, driven by the linkage plate, the gear seat rotating from an initial position to an unlocking driving position when the user exerts the unlocking operating force; and a drive rod, fixed at the gear seat, used for driving the lock core component.

6. The narrow-type door-lock driving device of claim 5, wherein the gear seat includes:

a disk gear, engaged with the rack for being driven by the linkage plate; and an adapter sleeve, fixed at the disk gear and fitted to secure the drive rod.

7. The narrow-type door-lock driving device of claim 5, further including: a gear seat return spring, disposed between the base and the gear seat, rotating from the unlocking driving position back to the initial position when the unlocking operating force is removed.

* * * * *